United States Patent [19]
Dueck et al.

[11] Patent Number: 6,012,834
[45] Date of Patent: Jan. 11, 2000

[54] APPARATUS AND METHOD FOR AUTOMATIC SELF-ADAPTING CONTROL OF SALES AND ADJUSTMENT OF PRICES TO MARKET MOVEMENTS IN AN AUTOMATIC VENDING MACHINE

[75] Inventors: Gunter Dueck, Neckargemünd; Jürgen Jäger, Leverkusen; Hermann Stamm-Wilbrandt, Nekarsteinach; Hans-Martin Wallmeier, Leimen, all of Germany

[73] Assignee: International Business Machines Corporation, Armonk, N.Y.

[21] Appl. No.: 08/982,796

[22] Filed: Dec. 2, 1997

[30] Foreign Application Priority Data

Feb. 12, 1997 [DE] Germany .............................. 197 05 245

[51] Int. Cl.$^7$ ...................................................... G06F 17/60
[52] U.S. Cl. ............................... 364/479.08; 364/479.01; 705/20
[58] Field of Search .............................. 705/1, 10, 20–22, 705/25–29, 409; 364/479.07, 479.14, 479.08; 235/381

[56] References Cited

U.S. PATENT DOCUMENTS

| | | | |
|---|---|---|---|
| 5,339,250 | 8/1994 | Durbin | 364/479.07 |
| 5,608,643 | 3/1997 | Wichter et al. | 364/479.14 |
| 5,615,109 | 3/1997 | Eder | 705/8 |
| 5,765,143 | 6/1998 | Sheldon et al. | 705/28 |
| 5,844,808 | 12/1998 | Konsmo et al. | 364/479.14 |

*Primary Examiner*—Allen R. MacDonald
*Assistant Examiner*—Hani M. Kazimi
*Attorney, Agent, or Firm*—McGinn & Gibb, P.C.; Stephen C. Kaufman, Esq.

[57] ABSTRACT

A description is given of an electronic auction machine, which reacts to changing sales conditions with appropriately adjusted machine prices. For existing automatic vending machines restocking is based upon very vague experience figures and in particular customary fluctuations in sales are not taken into consideration. With the proposed machine, using a computer current market data are recorded (31) and using these data the current market situation is automatically assessed (32,34). A corresponding updated machine price (33,35) is then displayed.

20 Claims, 4 Drawing Sheets

APPARATUS AND METHOD FOR AUTOMATIC SELF-ADAPTING CONTROL OF SALES AND ADJUSTMENT OF PRICES TO MARKET MOVEMENTS IN AN AUTOMATIC VENDING MACHINE

BACKGROUND OF THE INVENTION

The invention involves a method and a device for automatic adjustment of prices to market movements for automatic vending machines, in which a limited stock of goods or services is offered for sale.

INTRODUCTION TO THE INVENTION

Known automatic vending machines of the form mentioned, in which as an example consumables such as foodstuffs or flowers are offered for sale, are subject in general to relatively considerable fluctuations in demand and sales. In addition, changes in weather, holiday patterns or events of irregular nature occurring in the proximity of such machines frequently result in losses of sales or stocks of the goods offered, such as through spoilage. There are even some cases where the machines have become completely empty by the time they are next restocked.

Restocking required of individual items or of the entire stock on offer is performed at regular specified intervals of time. In most cases figures from experience are used as a basis for calculating the precise number of items for restocking, and in particular the relative stocking figures of the different goods offered can be of particular importance.

One particular disadvantage of such vending machines is that restocking can only be based upon very vague experience figures. In particular, one cannot take into consideration the fluctuations in sales referred to above. The only way of guaranteeing optimum exploitation at all times of existing machines is to check each machine frequently and regularly, in order to find the individual stock situation and then if necessary carry out refilling sooner or later. Such problems also arise in the field of pure services on offer. Thus in the case of independent or networked information stands (information kiosks) one could consider having a scale for any use charges related to the time of day, in order to offset in a better way the operating expenses for the appliance itself or the communication network behind it as they alter in the course of the day. Another area is represented by the on-line sale of entry tickets of various kinds. Such transactions can already now be dealt with by on-line services, and will arise in future to an increasing extent for the information stands mentioned previously as well.

SUMMARY OF THE INVENTION

Thus the task behind the present invention is to improve an automatic vending machine of this type in such a way that it can adjust prices to a current offer/demand situation independently, i.e. without any intervention from outside by the operator being required.

In the invention this task is solved in that by means of a data processing unit current market data such as the present time of day or the present stock in the machine of a specified item or service, or all goods or services offered are recorded in the machine. On the basis of such data an automatic assessment of the current market situation is undertaken, and thereafter an appropriately validated or updated machine vending price is displayed electronically.

Thus if it seems that the stock will soon be sold out, the price of an item can be increased, or reduced if sales are falling. In a further example there is provision for a special display such as a "special offer", which is activated in particular in the case of falling sales.

Overall the proposed machine operates like an electronic auctioneer.

It is emphasised that the fundamental concepts of the present invention—over and above the independently operating vending machine described initially—are also applicable to other areas of vending or sales planning, in which the pattern of sales is highly dependent upon external conditions such as the weather which are difficult to foresee, and in which continuous adjustment of prices (option trading) is possible for the changing conditions.

BRIEF DESCRIPTION OF THE DRAWING

In the following section an explanation is given of the invention using examples of versions and related to the drawings. In detail

DETAILED DESCRIPTION OF THE INVENTION

The invention is based upon the concept of defining a price by indication of appropriate sales forecasts rules and applying these in a vending machine of appropriate technology of this type. By recording figures which reflect the sales situation of the machine it is possible to produce an estimate of whether the sales position is better than expected, worse than expected, or normal. Parameters of this type for expected sales can be:

Type of day (working day, Sunday, holiday)

Time of day

Position of day in year (Summer, winter)

Proximity to holiday (Christmas, Easter, St. Valentines Day, Mothers Day)

Quantity sold since the machine was last refilled and its ratio to the normal quantity sold up to the time considered.

Related to these sales factors, the course of sales in such machines between two refillings is in general extremely varied. This relationship is made clearer using FIGS. 1a and b. These depict the course of sales in a diagram "quantity of goods or service (capacity) offered over time".

Figure 1A:
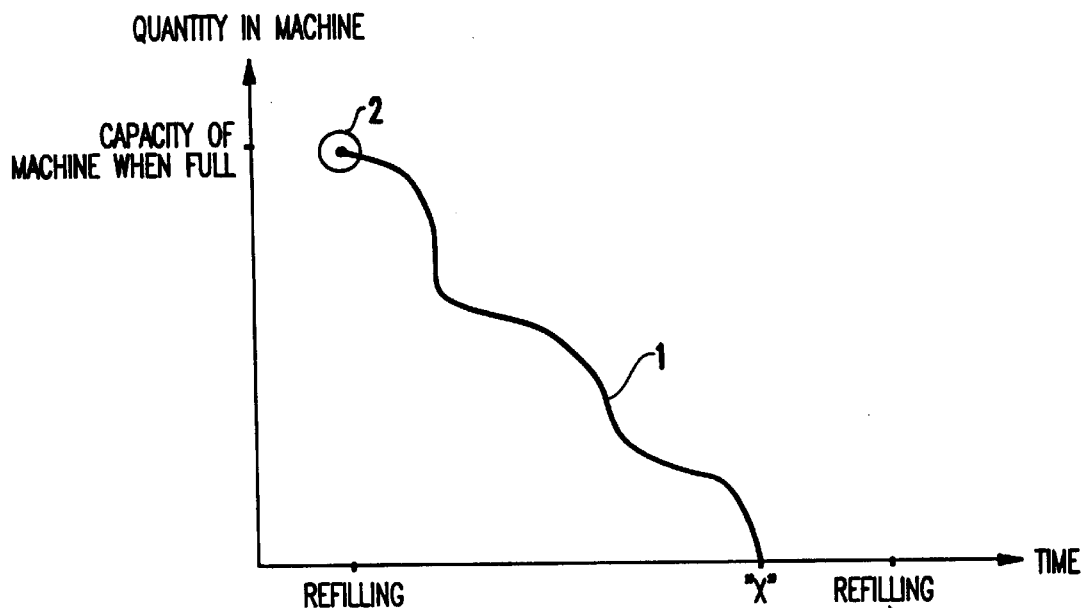
FIGS. 1a and 1b show sales curves (refilling capacity over time) of an automatic vending machine of current technology.

FIG. 1a depicts a sales situation using a sales curve 1, for an automatic vending machine which at refilling time 2 showed full capacity and was subject to relatively steady sales. At time x which is prior to the next refilling date 3, the machine is consequently already sold out. This situation could have been prevented if one had either brought the next refilling date forward or had sold the goods or service at a higher price already at an earlier stage (the auction principle). At any event this situation means that customers are annoyed, since after the time x they find the machine empty.

Figure 1B:
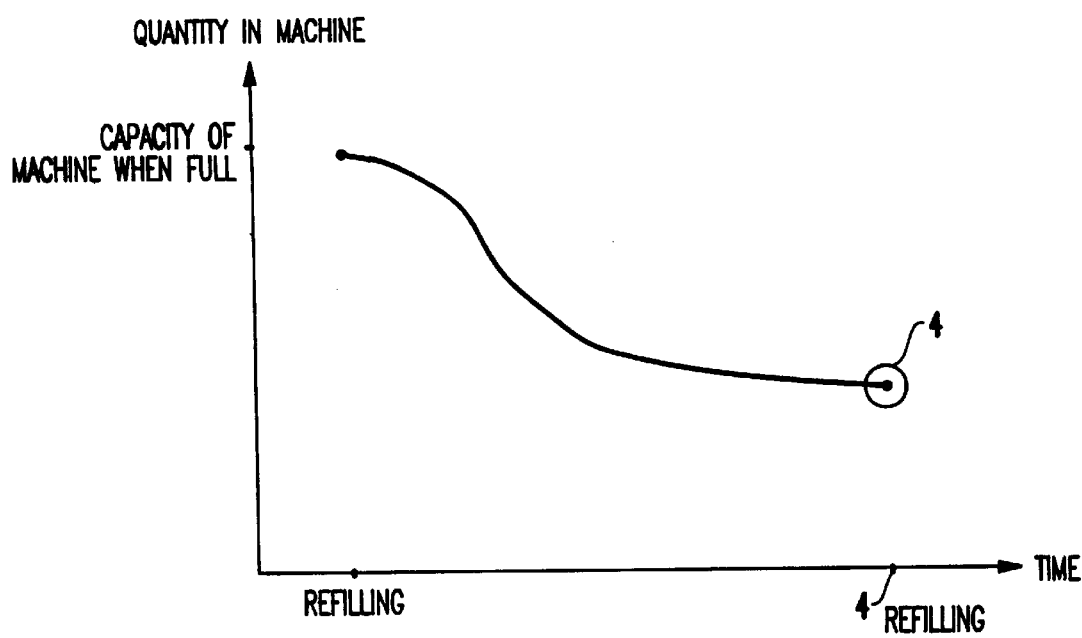

In contrast to this FIG. 1b depicts a situation where at time 4 for refilling the machine is still partially filled.

Consequently the goods could have been sold regularly at a lower price. This means that the operator of the machine has lost business. In addition, in the case of perishable goods such as filled rolls or flowers loss is incurred through the goods being spoilt and consequently unfit for sale.

In contrast to these disadvantages it is the aim of the invention to indicate a pricing mechanism by which such a machine would be enabled to create entirely independent sales curves, which would result in it being sold out at a time as close as possible to the new date for refilling. For this purpose the invention provides for different forms of tables in the machines, using which changes in price are made.

Figure 2:
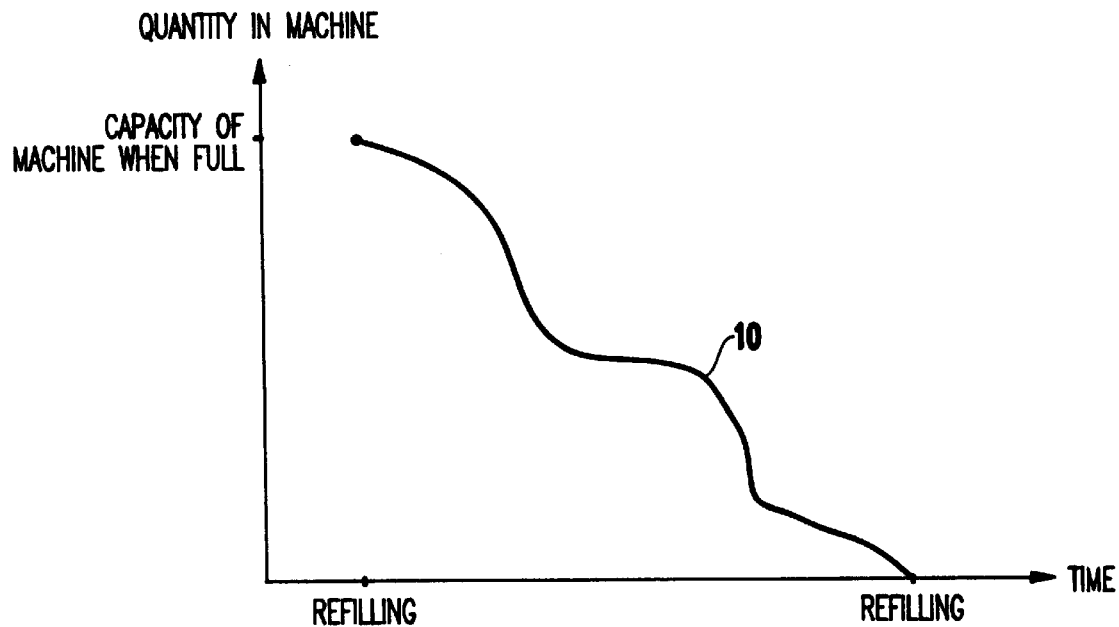
FIG. 2 shows an ideal sales line of an automatic vending machine as in the invention.

In a first step ideal sales lines—corresponding to the curve 10 shown in FIG. 2—are input into the machine, and these are used as a basis for control. It is of advantage to use different ideal lines, which are in accordance with different refilling periods (day types) for Sundays and holidays, for Summer or Winter, etc. Any deviations from such ideal lines cause the machine to adjust prices, as will be explained in more detail hereafter.

Figure 3:
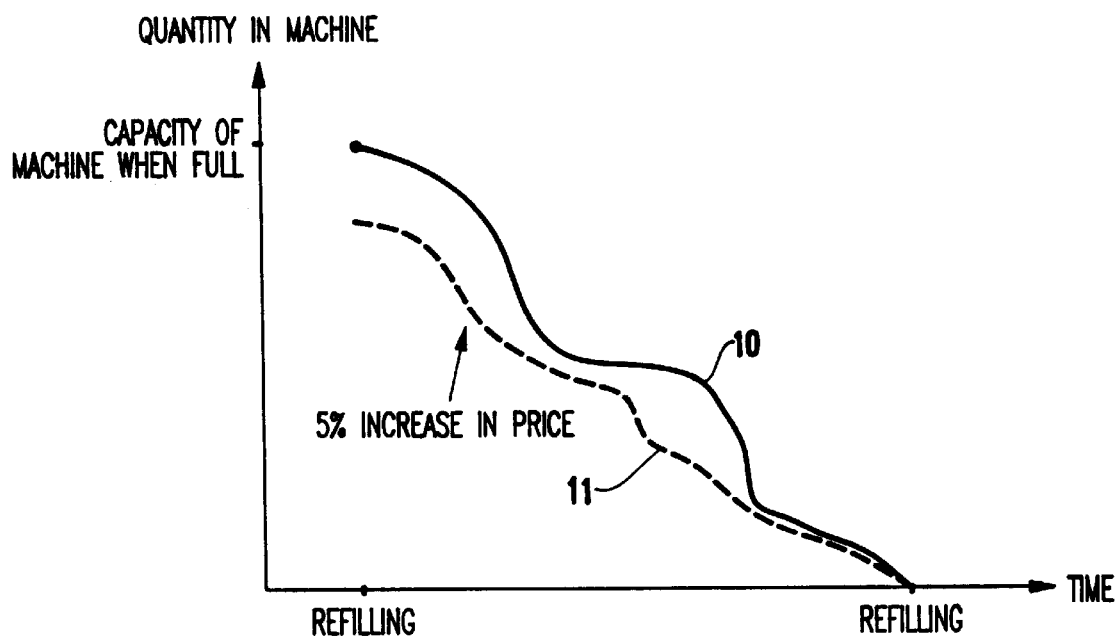
FIG. 3 shows the example of an ideal sales curve together with a currently ascertained sales curve (broken line) as in the invention.
Figure 4:
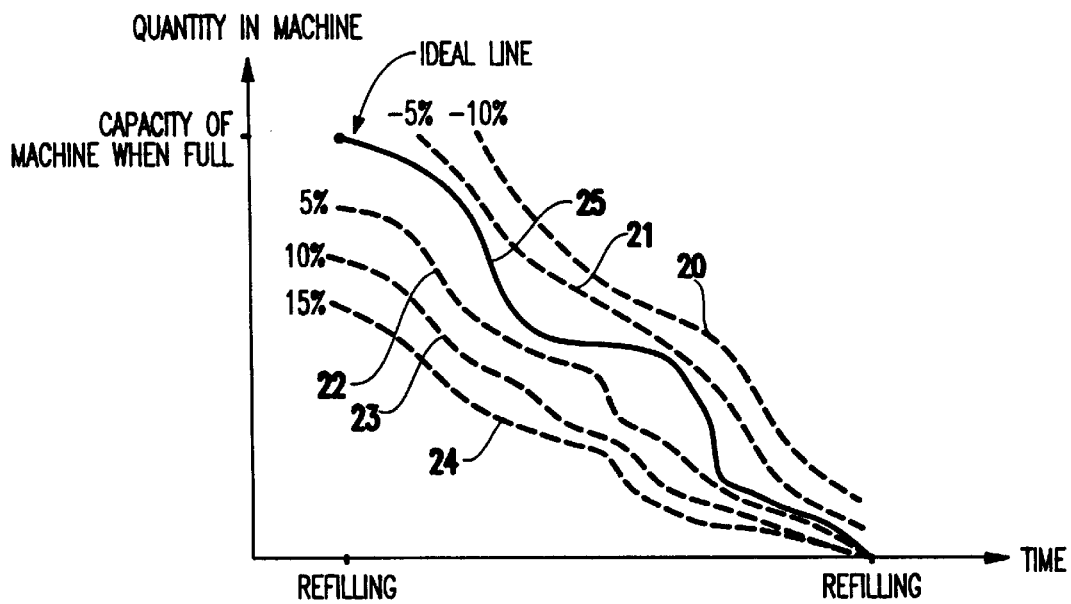
FIG. 4 shows a comprehensive conversion table with sales data as in a particular example of the invention.

Using the diagram shown in FIG. 3, if there are deviations from the individual ideal line 10, prices can now be changed. The continuous line 10 identifies an ideal sales curve, and the broken line 11 a current stocking situation. Once the deviation from the ideal line exceeds a certain margin, which can be characterised by a threshold, the price is increased, for example by 5%. FIG. 4 shows a complete price change table taking into consideration a number of different change band widths 20–24 either side of an ideal line 25.

For each type of day different forms of such tables are ascertained from statistical data and stored in a data base.

It is particularly useful for the data base to be in the form of an EEPROM (electronically erasable read only memory) which permits simpler adjustment of the tables in a retro-active process. The level of detail for the data base (number of tables per type of day, e.g. related to time of day or number of curves per table) is determined as required.

Figure 5:
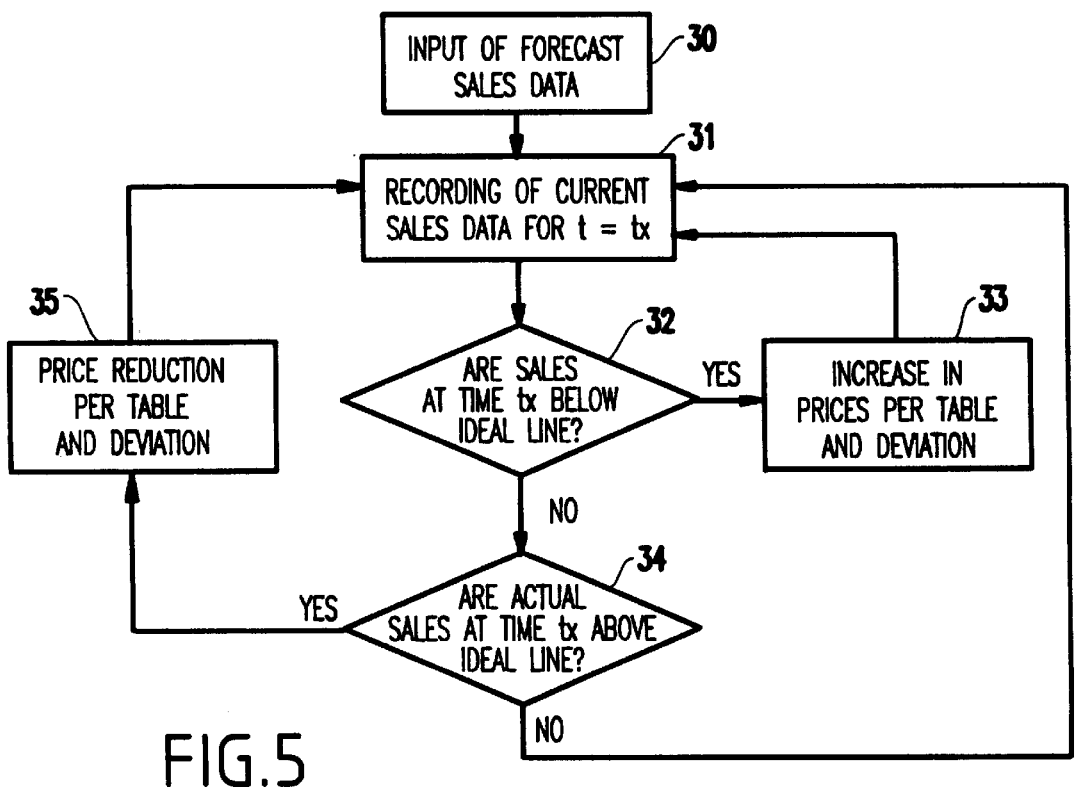
FIG. 5 shows steps in process as in the invention for adjustment of prices using a flow chart.

Using the flow chart pictured in FIG. 5, we shall now explain in more detail a version of the method as in the invention for adjustment of individual machine prices. Initially determination of the machine prices is based upon estimated forecast sales data 30, which is stored in a data base in the form of the change tables previously described. As already discussed, there can be provision for several change tables, each of which relates to different external conditions. These conditions can be recorded using light and/or temperature sensors (weather situation) and/or time emitters (day/night).

In the example at the time considered tx the current sales data (actual figures for goods and/or service stocks) are recorded using ordinary mechanical and/or electronic devices 31 and these are compared with the forecast sales data mentioned above. Should the current sales figures at the time considered be below the forecast FIGS. 32, this involving, say, at least one of the goods/services offered being possibly sold out, the individual machine prices are increased in accordance with the change table figures and in accordance with the individual deviations from the ideal curve 33. After this at a subsequent time which can be specified current sales data are again ascertained and processed accordingly. If the sales figures come within a specified tolerance around the ideal line, the existing machine prices are retained and a fresh comparison 32 is made at a later time.

But if the current sales figures are not below the ideal line, the next step is a check to see if the sales figures are above the ideal line 34. If so, the machine prices are reduced according to the individual deviation from the ideal curve 35.

Consequently, the following steps occur for adjustment of prices:

In relation to information about time of day, type of day and the weather which is stored in a buffer memory, the change tables to be used for each product are loaded from the data base;

For each product actual sales are compared with the band width stored in the tables, taking into consideration the next date for refilling;

From this the "next" curve is ascertained;

The price is then adjusted according to the individual band width.

Figure 6:
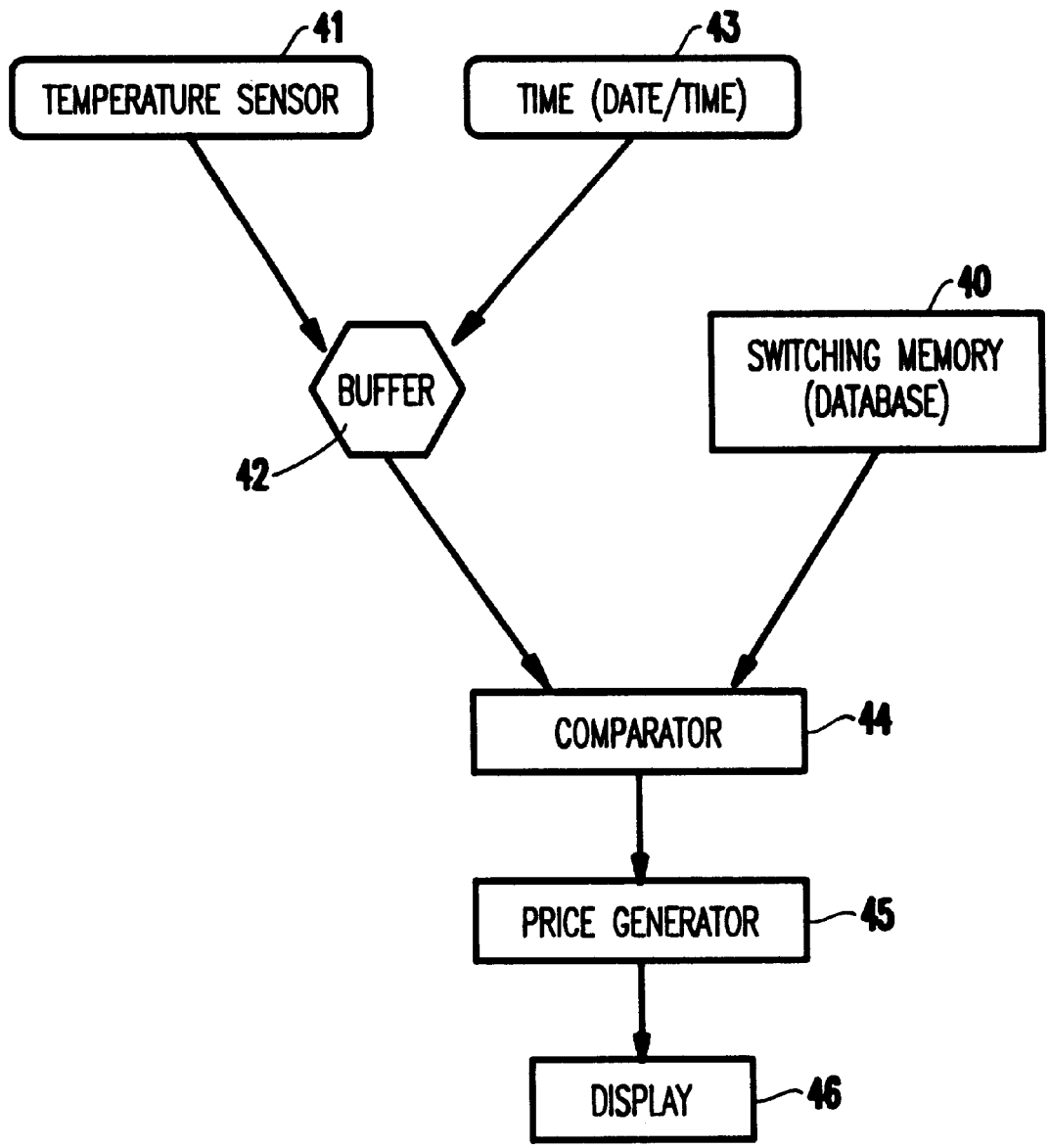
FIG. 6 shows the structure in principle of an electronic circuit to implement the price adjustment as in the invention.

As an alternative to the change tables described above which can be in the form of control programmes stored in the machine, we show below an implementation of the invention in the form of an electronic circuit using the principle drawing shown in FIG. 6. For this—as already stated above—the change table memory 40 comprising the data base takes the form of an EEPROM.

Using one or more sensors 41, in the example version information about weather, time of day and/or date (type of day) is recorded for purposes of appropriate pricing and stored in a buffer 42. In addition to this the time and/or individual date can be recorded by means of a timer 43 as a basis for the external conditions prevailing at the machine location. Equally current sales data (actual sales) determined in each case are also stored (not shown here).

The tables stored in the change memory are first compared with the data depicting the external conditions, using a comparator 44, and from the result of the comparison they are used as a basis for a table corresponding to these conditions. Moreover, using the comparator 44, or another comparator not shown here the current sales data are compared with the data contained in the individual table and the result is passed to a price generator 45. The price generator now generates a suitably adjusted new price for one or more of the goods/services offered which is finally depicted by a display 46—e.g visually.

Using the circuitry described above a vending machine of this type is able to generate amended machine prices entirely independently in accordance with the above concept and is able to display these using customary display equipment.

Alternative versions for the circuitry described above are, for example, "fuzzy-Logic" Systems, expert systems or neuronal networks, in which the ideal lines for specified external conditions are continually learned and optimised.

We claim:

1. A method for automatic self-adapting control of sales locally in an automatic vending machine in which a quantity of goods and/or services are offered at individually determined machine prices, comprising:

preparing sales forecast data based upon expected sales of said goods and/or services;

recording current sales data of said goods and/or services;

adjusting locally and without any intervention from outside said automatic vending machine, at least one machine price in relation to the deviation of current sales data from the forecast sales data; and displaying an appropriately adjusted machine price of said goods and/or services.

2. The method as in claim 1, wherein expected sales are determined in accordance with parameters for conditions existing outside the machine.

3. The method as in claim 2, wherein the forecast sales data are represented by at least one data string having at least one ideal sales curve and an allocated change band width, which defines a range bordering the at least one ideal sales curve, providing an upper and lower threshold of normal sales activity beyond which a change of displayed vending machine prices is triggered.

4. The method as in claim 3, wherein at least two data strings are used for the sales forecast, each of which is recorded with at least one parameter related to external conditions, so that a switch is made between the data strings according to the conditions recorded.

5. The method as in claim 1, wherein a transition from a higher to a lower machine price is displayed in a particular manner.

6. A method as in claim 3, wherein said at least one ideal sales curve and/or said change band width are determined or learned automatically.

7. An automatic vending machine in which a quantity of goods and/or services is offered at individually and locally determined machine prices, comprising:

a change table memory for storing forecast sales data for expected sales;

a recorder for recording current market data;

a comparator for automatic assessment of market position based upon said current market data and the forecast sales data;

a price generator for calculation of a current machine price for at least one of the goods and/or services based upon an input from said comparator and without intervention from outside of said automatic vending machine; and a display, for communicating the current machine prices, based on an input from said price generator.

8. The automatic vending machine as claimed in claim 7, wherein said forecast sales data comprises at least two data strings;

wherein said current market data received from said recorder is correlated with at least one parameter; and wherein said change table memory switches between the data strings in accordance with the current market variables recorded.

9. The automatic vending machine as claimed in claim 7, further comprising:

a sensor for recording sales conditions prevailing outside the machine;

a timer for recording the current time, wherein said change table memory stores switching tables therein for switching between the forecast sales data in accordance with the current market variables recorded and wherein said comparator compares the current sales data with corresponding sales data from the switching tables and wherein said price generator generates current machine prices based on an input from said comparator.

10. An automatic vending machine as claimed in claim 7, wherein said display includes a special display for displaying a transition from a higher to a lower machine price.

11. An automatic vending machine, in which a quantity of goods and/or services is offered at locally determined machine prices, comprising:

a memory for storing at least one ideal sales curve for selected parameters, wherein each said at least one ideal sales curve is the output of at least one data string;

a sensor for recording internal and external environmental variables;

a comparator for comparing an ideal sales curve for selected parameters to an actual sales curve for selected parameters, such that a best fit sales curve is selected;

a price generator for generating locally an adjusted price based on input from the comparator; and a display for displaying visually a price output by the price generator.

12. The automatic vending machine as claimed in claim 11, wherein said comparator produces a decision of whether actual sales are above, below, or equal to historical sales for selected parameters contained in said memory, wherein said selected parameters include at least one of:

at least one ideal sales curve per independent variable measured;

a last replenishment date of said goods and/or services;

a record of actual sales data from said last inventory replenishment date;

a next inventory replenishment date of said goods and/or services;

a measurement date;

a time of day on said measurement date;

a type of day of said measurement date; and a season of said measurement date.

13. The automatic vending machine as claimed in claim 11, wherein said comparator generates an independent sales curve to create a price movement which would result in the last sale being made at the reorder date.

14. The automatic vending machine as claimed in claim 11, wherein said memory includes a table storing ideal sales lines based upon selected variables are entered and held for comparison to current sales data.

15. The automatic vending machine as claimed in claim 11, wherein said memory provides a plurality of statistical tables indicating sales and price changes for day types.

16. The automatic vending machine as claimed in claim 11, wherein said memory comprises an electronically erasable read-only memory (EEPROM).

17. The automatic vending machine as claimed in claim 11, wherein said price generator outputs a higher sales price when the sales curve calculated using a current period sales activity is less than the statistical sales curve.

18. The automatic vending machine as claimed in claim 11, wherein said price generator outputs a lower sales price when the sales curve calculated using current period sales activity is greater than the statistical sales curve.

19. The method as claimed in claim 11, wherein said at least one data string comprises a change table.

20. An automatic vending machine, in which a quantity of goods and/or services is offered at prices determined by the individual machine locally using locally gathered data, comprising:

a memory for storing a plurality of statistical sales curves, wherein each of said statistical sales curves is correlated with at least one measurable variable and is based on historical performance;

a plurality of sensors for measuring and recording variables in the locality of said vending machine affecting sales activity, and providing an input to said memory;

a recorder, operatively coupled to said memory, for recording actual sales activity for a predetermined time period;

a first comparator, operatively coupled to said memory, for comparing measurements of said sensors to historical measurements wherein result is a historical sales curve based on measurements of current variables;

a second comparator, operatively coupled to said memory, for comparing said historical sales curve based on measurements of current variables to the actual sales activity;

a price generator, operatively coupled to said memory, for generating a price for one or more goods/services offered based on a calculation using an output of said second comparator; and a display for displaying said price generated by said price generator.

\* \* \* \* \*